(12) United States Patent
Gagnon-Martin et al.

(10) Patent No.: US 11,613,995 B2
(45) Date of Patent: Mar. 28, 2023

(54) ROTARY ENGINE WITH HOUSING HAVING SILICON CARBIDE PLATE

(71) Applicant: PRATT & WHITNEY CANADA CORP., Longueuil (CA)

(72) Inventors: David Gagnon-Martin, Longueuil (CA); Bruno Villeneuve, Boucherville (CA); Sebastien Bolduc, St-Bruno-de-Montarville (CA); Jean-Philippe Simoneau, Saint-Constant (CA); Jean-Gabriel Gauvreau, Varennes (CA); Johnny Vinski, Chateauguay (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 386 days.

(21) Appl. No.: 16/665,428

(22) Filed: Oct. 28, 2019

(65) Prior Publication Data

US 2020/0200009 A1    Jun. 25, 2020

Related U.S. Application Data

(60) Provisional application No. 62/782,454, filed on Dec. 20, 2018.

(51) Int. Cl.
*F01C 1/22*      (2006.01)
*F01C 19/10*     (2006.01)
(Continued)

(52) U.S. Cl.
CPC ............... *F01C 1/22* (2013.01); *F01C 19/10* (2013.01); *F01C 21/06* (2013.01); *F01C 21/108* (2013.01);
(Continued)

(58) Field of Classification Search
CPC .. F01C 19/10; F01C 1/22; F01C 21/06; F01C 21/108; F02B 2053/005; F02B 55/02; F04C 2270/16; F04C 27/008; F04C 29/0028
See application file for complete search history.

(56) References Cited

U.S. PATENT DOCUMENTS 3,833,320 A    9/1974  Telang
3,970,527 A    7/1976  Brown
(Continued)

FOREIGN PATENT DOCUMENTS

DE    102008026920 A1    6/2009
DE    102010034979 A1    2/2012
(Continued)

OTHER PUBLICATIONS

European Search Report issued in corresponding EP application No. 19219031.2 dated May 6, 2020.

*Primary Examiner* — Mary Davis
(74) *Attorney, Agent, or Firm* — Norton Rose Fulbright Canada LLP.

(57) ABSTRACT

A rotary internal combustion engine has: a rotor; a housing circumscribing a rotor cavity, the rotor received within the rotor cavity, the housing having a peripheral wall and a side housing assembly secured to the peripheral wall, the side housing assembly having plates located at spaced apart ends of the peripheral wall, the plates defining seal running surfaces in sealing engagement with opposed end faces of the rotor, the plates made of silicon carbide.

16 Claims, 5 Drawing Sheets

(51) Int. Cl.
*F01C 21/10* (2006.01)
*F01C 21/06* (2006.01)
*F04C 27/00* (2006.01)
*F04C 29/00* (2006.01)
*F02B 55/02* (2006.01)
*F02B 53/00* (2006.01)

(52) U.S. Cl.
CPC ........ *F04C 27/008* (2013.01); *F04C 29/0028* (2013.01); *F02B 55/02* (2013.01); *F02B 2053/005* (2013.01); *F04C 2230/90* (2013.01); *F04C 2270/16* (2013.01)

(56) References Cited

U.S. PATENT DOCUMENTS

| | | | | |
|---|---|---|---|---|
| 4,137,024 | A | * | 1/1979 | Jones ........................ F01C 1/22 |
| | | | | 418/116 |
| 4,259,932 | A | | 4/1981 | Hideg |
| 4,782,656 | A | * | 11/1988 | Hansen ................. F01C 1/3441 |
| | | | | 60/39.6 |
| 9,896,934 | B2 | | 2/2018 | Villeneuve |
| 2011/0126795 | A1 | * | 6/2011 | Hua ......................... F01C 1/22 |
| | | | | 123/245 |
| 2015/0167546 | A1 | * | 6/2015 | Villeneuve .............. F02B 55/02 |
| | | | | 418/61.2 |
| 2018/0163541 | A1 | | 6/2018 | Villeneuve et al. |

FOREIGN PATENT DOCUMENTS

| | | |
|---|---|---|
| DE | 102016012262 A1 | 4/2018 |
| GB | 2432630 A | 5/2007 |

* cited by examiner

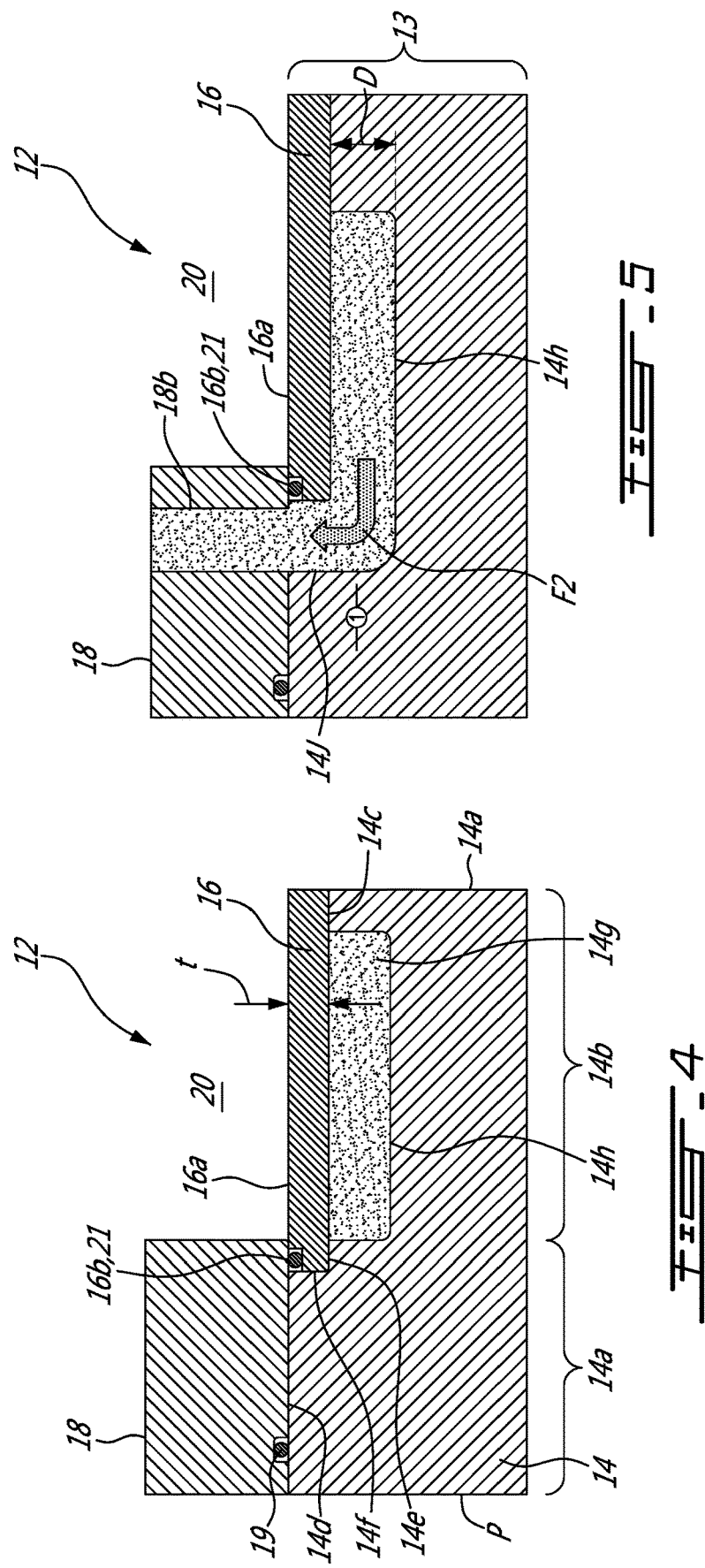

ROTARY ENGINE WITH HOUSING HAVING SILICON CARBIDE PLATE

CROSS-REFERENCE TO RELATED APPLICATIONS

This application claims priority to U.S. provisional patent application No. 62/782,454 filed Dec. 20, 2018, the entire contents of which are incorporated by reference herein.

TECHNICAL FIELD

The application relates generally to internal combustion engines and, more particularly, to rotary internal combustion engines.

BACKGROUND OF THE ART

Combustion chambers of a rotary engine, such as a Wankel engine, are delimited radially by the rotor and rotor housing and axially by the two end walls. The end walls facing the combustion chamber are subjected to high pressure and thermal loads. On the other hand, the end walls must provide the running surface for the rotor's side seals.

SUMMARY

In one aspect, there is provided a rotary internal combustion engine comprising: a rotor; a housing circumscribing a rotor cavity, the rotor received within the rotor cavity, the housing having a peripheral wall and a side housing assembly secured to the peripheral wall, the side housing assembly having plates located at spaced apart ends of the peripheral wall, the plates defining seal running surfaces in sealing engagement with opposed end faces of the rotor, the plates made of silicon carbide.

In another aspect, there is provided a rotary internal combustion engine comprising: a rotor; a housing circumscribing a rotor cavity receiving the rotor, the housing having a peripheral wall, end walls secured to opposed ends of the peripheral walls, and silicon carbide plates located on inner sides of the end walls and facing the rotor cavity, the silicon carbide plates defining seal running surfaces in sealing engagement with end faces of the rotor.

In yet another aspect, there is provided a housing for a rotary internal combustion engine, the housing comprising: a peripheral wall; end walls secured to opposed ends of the peripheral wall, the peripheral wall and the end walls circumscribing a rotor cavity for receiving a rotor therein; and silicon carbide plates located on inner sides of the end walls and facing the rotor cavity, the silicon carbide plates defining seal running surfaces in sealing engagement with end faces of the rotor.

DESCRIPTION OF THE DRAWINGS

Reference is now made to the accompanying figures in which:

FIG. 4 is a schematic cross-sectional view taken along line B-B of FIG. 2 in accordance with one embodiment;

FIG. 5 is a schematic cross-sectional view taken along line A-A of FIG. 2 in accordance with the embodiment of FIG. 4;

DETAILED DESCRIPTION

Figure 1:
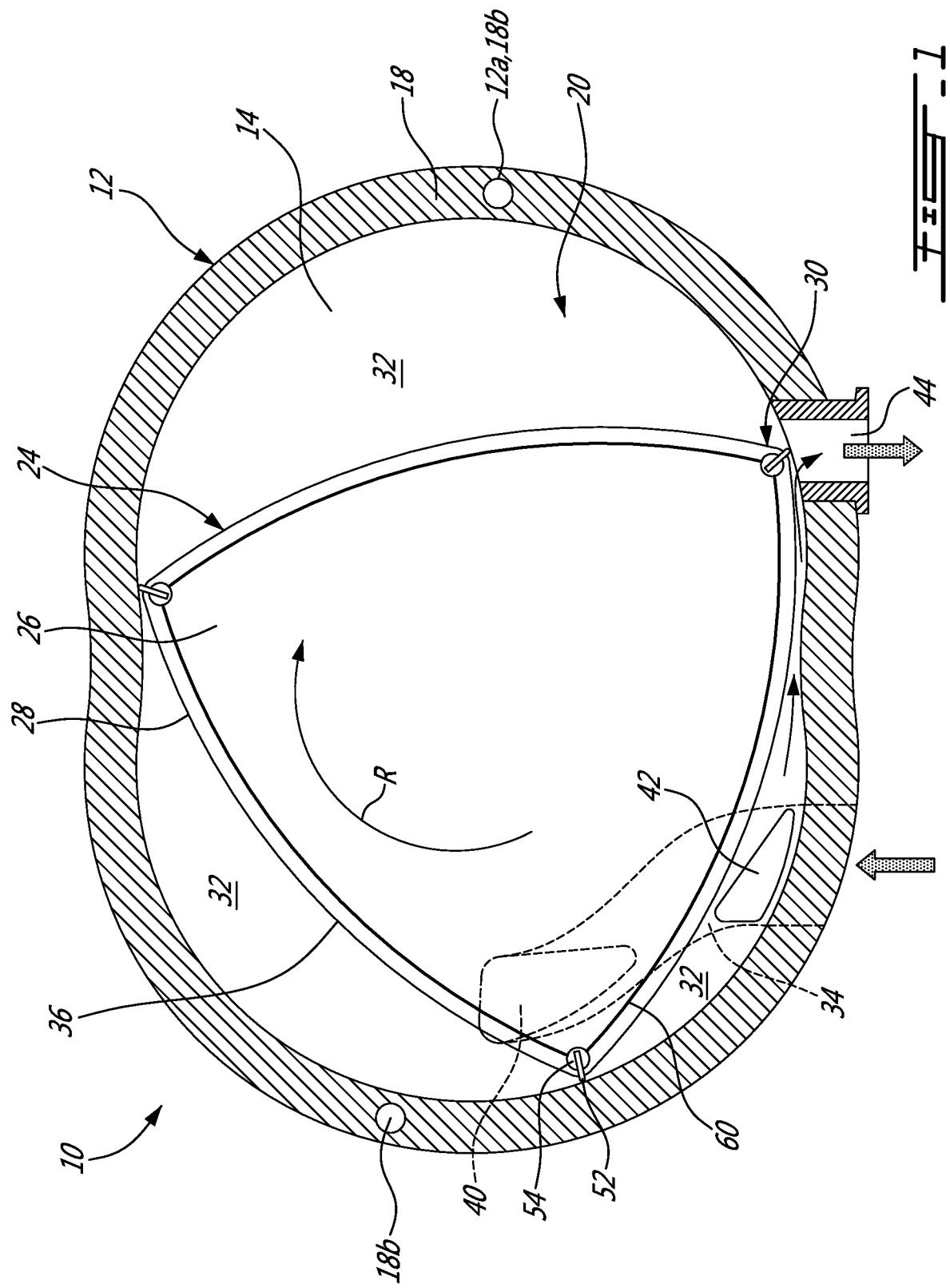
FIG. 1 is a schematic cross-sectional view of a rotary internal combustion engine in accordance with a particular embodiment.
Figure 3:
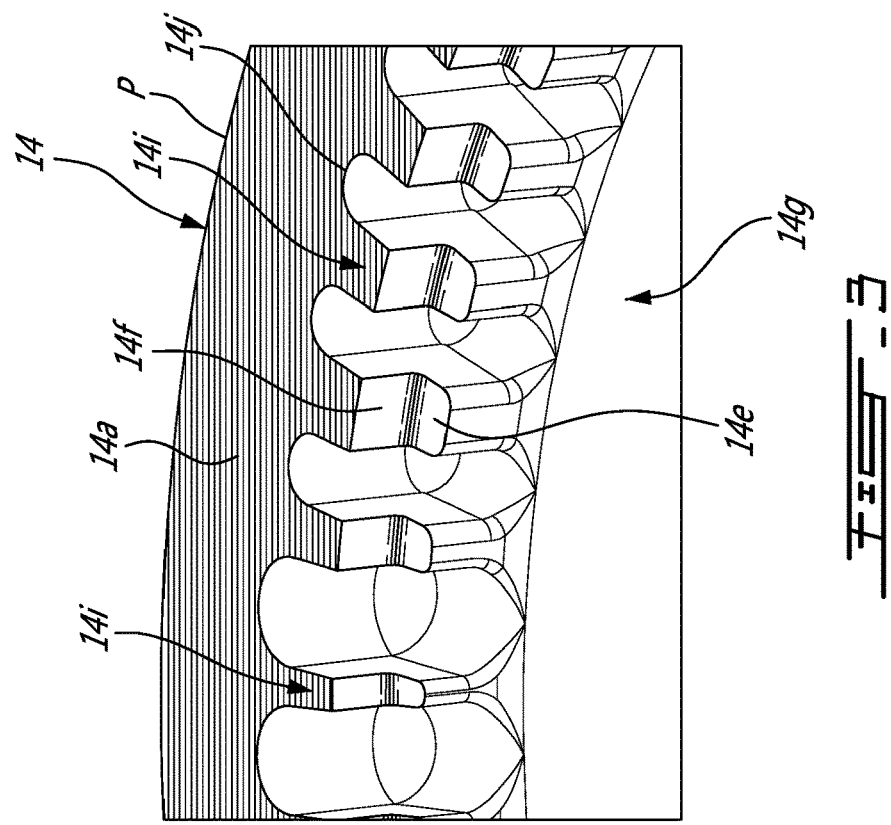
FIG. 3 is a schematic fragmented three-dimensional view of the side wall of FIG. 2.

Referring to FIG. 1, a rotary internal combustion engine 10, which may be a Wankel engine, is schematically shown. The rotary engine 10 comprises an outer body 12 having axially-spaced end walls, 14 with a peripheral wall 18 extending therebetween to form a rotor cavity 20. The inner surface of the peripheral wall 18 of the cavity 20 has a profile defining two lobes, which may be an epitrochoid.

The outer body 12 includes a coolant circuitry 12a, which may include a plurality of coolant conduits 18b defined within the peripheral wall 18. As shown more clearly in FIG. 5, the coolant conduits 18b extends from one of the axially-space end walls 14 to the other. The coolant circuitry 12a is used for circulating a coolant, such as water, to cool the outer body 12 during operation of the engine 10. Although only two coolant conduits 18b are shown, it is understood that more than two conduits 18b may be used without departing from the scope of the present disclosure.

An inner body or rotor 24 is received within the cavity 20. The rotor 24 has axially spaced end faces 26 adjacent to the outer body end walls 14, and a peripheral face 28 extending therebetween. The peripheral face 28 defines three circumferentially-spaced apex portions 30, and a generally triangular profile with outwardly arched sides 36. The apex portions 30 are in sealing engagement with the inner surface of peripheral wall 18 to form three rotating combustion chambers 32 between the inner rotor 24 and outer body 12. The geometrical axis of the rotor 24 is offset from and parallel to the axis of the outer body 12.

The combustion chambers 32 are sealed. In the embodiment shown, each rotor apex portion 30 has an apex seal 52 extending from one end face 26 to the other and biased radially outwardly against the peripheral wall 18. An end seal 54 engages each end of each apex seal 52 and is biased against the respective end wall 14. Each end face 26 of the rotor 24 has at least one arc-shaped face seal 60 running from each apex portion 30 to each adjacent apex portion 30, adjacent to but inwardly of the rotor periphery throughout its length, in sealing engagement with the end seal 54 adjacent each end thereof and biased into sealing engagement with the adjacent side wall 14. Alternate sealing arrangements are also possible.

Although not shown in the Figures, the rotor 24 is journaled on an eccentric portion of a shaft such that the shaft rotates the rotor 24 to perform orbital revolutions within the stator cavity 20. The shaft may rotate three times for each complete rotation of the rotor 24 as it moves around the stator cavity 20. Oil seals are provided around the eccentric to impede leakage flow of lubricating oil radially outwardly thereof between the respective rotor end face 26 and outer body end wall 14. During each rotation of the rotor 24, each chamber 32 varies in volumes and moves around the stator cavity 20 to undergo the four phases of intake, compression, expansion and exhaust, these phases being similar to the strokes in a reciprocating-type internal combustion engine having a four-stroke cycle.

The engine includes a primary inlet port 40 in communication with a source of air, an exhaust port 44, and an optional purge port 42 also in communication with the source of air (e.g. a compressor) and located between the inlet and exhaust ports 40, 44. The ports 40, 42, 44 may be defined in the side wall 14 of in the peripheral wall 18. In the embodiment shown, the inlet port 40 and purge port 42 are defined in the side wall 14 and communicate with a same intake duct 34 defined as a channel in the side wall 14, and the exhaust port 44 is defined through the peripheral wall 18. Alternate configurations are possible.

In a particular embodiment, fuel such as kerosene (jet fuel) or other suitable fuel is delivered into the chamber 32 through a fuel port (not shown) such that the chamber 32 is stratified with a rich fuel-air mixture near the ignition source and a leaner mixture elsewhere, and the fuel-air mixture may be ignited within the housing using any suitable ignition system known in the art (e.g. spark plug, glow plug). In a particular embodiment, the rotary engine 10 operates under the principle of the Miller or Atkinson cycle, with its compression ratio lower than its expansion ratio, through appropriate relative location of the primary inlet port 40 and exhaust port 44.

Referring now to FIGS. 2-5, a portion of one of the side housings, or end walls 14 is illustrated. More specifically, the portion of the end wall 14 that is shown corresponds to a portion located proximate an outer perimeter P (FIG. 4) of the end wall 14 and that is configured to be in abutment against the peripheral wall 18 for defining the rotor cavity 20.

In the embodiment shown, each of the end walls 14 is configured to be secured to a respective one of opposed ends of the peripheral wall 18. Plates 16 are located on inner sides of the end walls 14 and define surfaces 16a on which the seals 60 of the rotor 24 are in abutment during rotation of the rotor 24. In a particular embodiment, the plates 16 may be monolithic with the end walls 14.

The end walls 14 may be made of aluminum, more specifically an aluminum alloy, due to its light weight and high thermal conductivity. However, it may be required that the surfaces of the end walls 14 in contact with the seals 60 be coated to provide a wear-resistance surface. Moreover, aluminum has high thermal coefficient of expansion and low Young's modulus, which may result in high deflections under respectively, high thermal and pressure loads.

In the embodiment shown, the plates 16 are made of silicon carbide. In other words, at least a portion of the outer body 12 that is in sealing engagement with the seals 60 of the rotor body 24 is made of silicon carbide. The plates 16 are thus made of a material different than a material of the peripheral wall 18 of the engine. This specific material may have the advantages of aluminum, such as high thermal conductivity combined with low density, and may lack its drawbacks, such as high thermal coefficient of expansion and low Young's modulus. In addition, silicon carbide's intrinsically high hardness may not require wear-resistant coating. In a particular embodiment, the use of a silicon carbide side plate 16 provides a thermally and structurally stable running surface for the side that is also wear resistant. Any other suitable ceramic material may be used. For instance, aluminum nitride may be used.

Selecting a material for the plates 16 require maximizing a ratio of the thermal conductivity to the coefficient of thermal expansion while maximizing the Young's modulus.

In use, heat generated by the combustion in the combustion chamber 32 is evacuated to the liquid coolant partially through the plates 16. If a heat flow through the plates 16 is insufficient, the temperature will exceed a threshold beyond which the lubricant deteriorates and impedes performance of the engine. However, if the plates 16 are made thinner to increase the heat flow therethrough, they may not be stiff enough to withstand the loads imparted to the plates 16 under operation. Consequently, a balance is achieved between the thickness of the plates, the thermal conductivity of their constituent material, and their coefficient of thermal expansion.

In the embodiment shown, the plates 16 are made of silicon carbide sold by the company Kyocera under the name SC 1000. This type of silicon carbide has a high thermal conductivity and a low coefficient of thermal expansion as well as a high Young's modulus. Moreover, a hardness of this material is greater than that of silicon carbide coatings that may be used in other rotary engines. In the embodiment shown, the thickness of the plates 16 ranges from 1/8" to 1/2", preferably from 1/8" to 3/8", preferably from 1/4" to 5/16". The thickness of the plates 16 is substantially greater than that of a coating of silicon carbide, which is typically in the range of 10 to 15 thousandths of an inch. The thickness of the plates 16 may not scale with other dimensions of the engine when increasing a size of the engine as the thermal conditions do not change with the size of the engine.

However, as the material of the plates 16 may be different than that of the side walls 14, and hence may differ in their respective coefficients of thermal expansion, the silicon carbide plates 16 may transmit thermal stress to the side walls 14. To at least partially alleviate this phenomenon, the plates 16 may be mechanically unconstrained (e.g., floating) such that mechanical deformations imposed on it by surrounding structures might be minimized. Below is described one possible embodiment allowing the plates 16 to be mechanically unconstrained.

The end walls, 14 and the plates 16 are described in more detail. Although the text below uses the singular form, the description may be applied to both of the side walls 14 and to both of the plates 16.

The side wall 14 includes a peripheral section 14a, which is in abutment with the peripheral wall 18, and a center section 14b (FIG. 4), which is circumferentially surrounded by the peripheral section 14a. The peripheral section 14a of the end wall 14 may be secured to the peripheral wall 18. The center section 14b of one of the side walls 14 faces the center section 14b of the other of the side walls 14. The side walls 14 are secured to the peripheral wall 18 with any suitable means known in the art. As shown, a sealing member 19 is located between the peripheral wall 18 and the peripheral portions 14a of the side walls 14 for limiting combustion gases from leaking out of the rotor cavity 20. The sealing member 19 may be a O-ring. The sealing member 19 may be received within an annular recess, which may be defined by one or more of the peripheral wall 18 and the end wall 14.

The side wall 14 defines a recess 14c for receiving the plate 16. The peripheral portion 14a of the side wall 14 extends from the outer perimeter P to the recess 14c. As shown, a surface 14d of the peripheral portion 14a of the side wall 14 that faces the peripheral wall 18 is axially offset from a surface 14e of the center portion 14b of the side wall. A magnitude of the offset corresponds to a depth of the recess 14c and may correspond to a thickness t of the plate 16. The plate 16 is therefore in abutment with the surface 14e of the center portion 14b of the side wall 14. In other words, a sealing surface of the plate 16, located on a side of the plate 16 that faces the rotor cavity, may be aligned with the peripheral section 14a of the end wall 14.

The side wall 14 defines an abutment surface 14f. The abutment surface 14f is defined by a shoulder created by the offset of the surfaces 14d, 14e of the peripheral and central portions 14a, 14b of the side wall 14. The side wall 14, via its abutment surface 14f, limits radial movements of the plate 16 relative to the axis of rotation of the rotor 24.

In a particular embodiment, a gap may remain between a peripheral section of the plate 16 and the abutment surface 14f of the side wall 14. In other words, and in the embodiment shown, the plate 16 is spaced apart from the abutment surface 14f. A size of the gap may change during operation of the engine 10 as the side wall 14 and the plate 16 may expand at different rates with an increase of a temperature in the rotor cavity 20. In other words, the space between the plate 16 and the abutment surface 14f of the side wall 14 may allow relative thermal expansion between the plate 16 and the side wall 14 so that thermal stress transferred from the plate 16 to the peripheral wall 18 and the end wall 14 might be minimized.

To limit axial movements of the plate 16 relative to the axis of rotation of the rotor 24 (FIG. 1), a periphery of the plate 16 is contained axially between the housing 18 and the side wall 14. In other words, the periphery of the plate 16 is sandwiched between the side wall 14 and the peripheral wall 18. A sealing member 21 is located at the periphery of the plate 16 for limiting the combustion gases to leak out of the rotor cavity 20 and for limiting the cooling fluid to leak into the combustion chamber 32 (FIG. 1). As shown more specifically in FIGS. 4-5, the sealing member 21 is contained within a recess 16b defined by the plate 16. The sealing member 21 may be a O-ring. Any suitable sealing member may be used.

In a particular embodiment, the sealing member 21 and the abutment surface 14f of the side wall 14 allows the plate 16 to move radially relative to the side wall. Such a movement, along a radial direction relative to the axis of rotation of the rotor body 24, may be required in a configuration in which the side wall 14 is made of a material having a coefficient of thermal expansion different than that of the plate 16.

The side wall 14 further defines a pocket 14g that may circumferentially extend a full circumference of the side wall 14. In other words, the pocket 14g is annular. The pocket 14g may not cover an entirety of the center portion 14b of the side wall 14. The pocket 14g is configured for circulating a liquid coolant, such as water for cooling the plate 16. The pocket 14g may be part of the fluid circuitry 12a and is in fluid flow communication with the conduits 18b that are defined in the peripheral wall 18. The pocket 14g extends from the surface 14e of the center portion 14b and away from the rotor cavity 20. A depth D of the pocket 14g is defined by a distance along the axis of rotation of the rotor body 24 between the surface 14e of the center portion 14b and a bottom surface 14h of the pocket 14g.

The peripheral portion 14a of the side wall 14 defines a plurality of ribs 14i that are circumferentially distributed around the rotor cavity. The ribs 14i defines the abutment surface 14f and a portion of the surface 14e of the center portion 14b of the side wall 14. Consequently, and in the depicted embodiment, the abutment surface 14f is defined by a plurality of surfaces defined by the ribs 14i. The ribs 14i may be configured to support a pressure load imparted by a combustion of a mixture of air and fuel within the combustion chambers 32.

Cavities or spaces 14j are defined between the ribs 14i. More specifically, each pair of two consecutive ones of the ribs 14i defines a space 14j therebetween. The spaces 14j are in fluid communication with the pocket 14g and with the conduits 18b of the peripheral wall 18. Stated otherwise, the conduits 18b are in fluid communication with the pocket 14g via the spaces 14j between the ribs 14i. The spaces 14j may allow the liquid coolant to flow from the pocket 14g to the conduits 18b of the peripheral wall 18. It is understood that the liquid coolant may be circulated in closed loop and through a heat exchanger. The heat exchanger may be used to dissipate heat to an environment outside the engine; the heat transferred from the engine to the liquid coolant.

Figure 2:
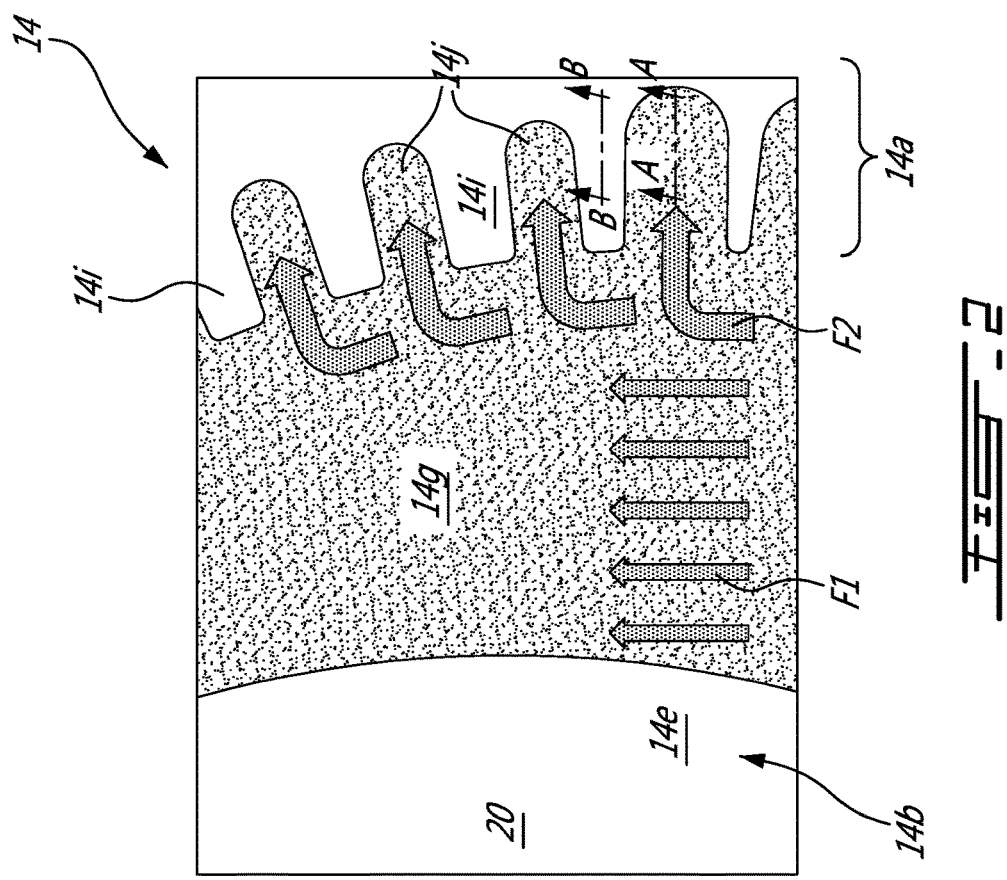
FIG. 2 is a schematic fragmented top view of an end wall of a housing of the rotary internal combustion engine of FIG. 1.

As shown in FIGS. 2 and 5, a flow F1 of the liquid coolant circulates within the pocket 14g. The flow F1 is divided in sub-flows F2; each of the sub-flows F2 circulating within a respective one of the spaces 14i and within a respective one of the conduits 18b of the coolant circuitry 12a. The liquid coolant may be circulated out of the outer body 12 and within a heat exchanger for extracting the heat. The liquid coolant may then be reinjected in the coolant circuitry 12a for further heat extraction.

Figure 7:
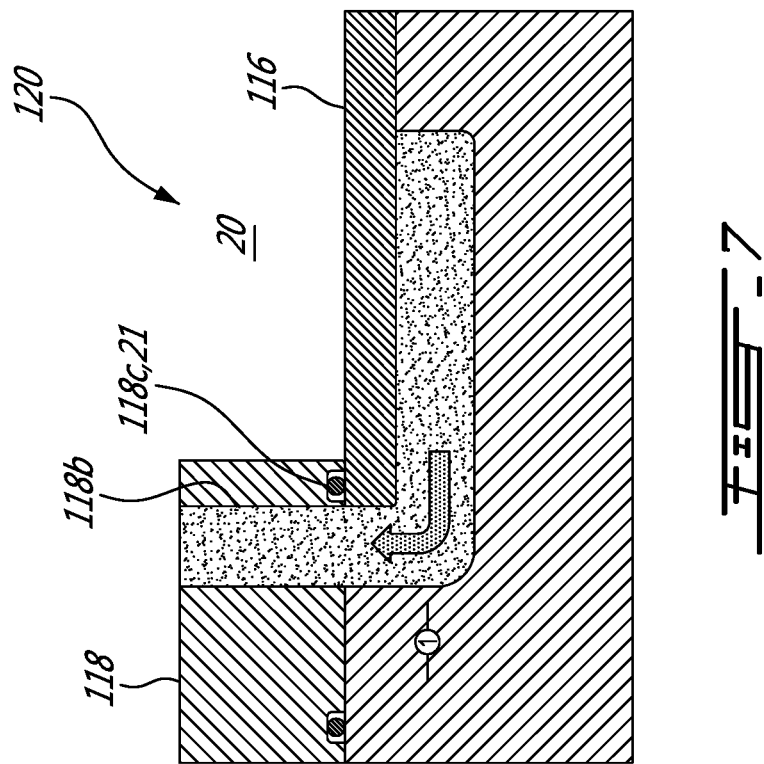
FIG. 7 is a schematic cross-sectional view taken along line A-A of FIG. 2 in accordance with the embodiment of FIG. 6.
Figure 6:
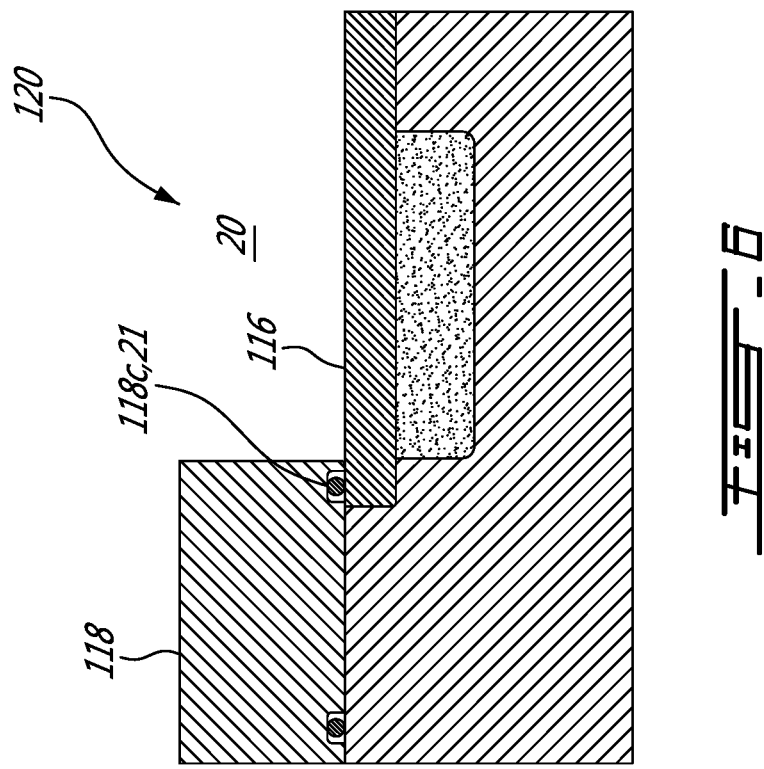
FIG. 6 is a schematic cross-sectional view taken along line B-B of FIG. 2 in accordance with another embodiment.

Referring now to FIGS. 6-7, another embodiment of the outer body is generally shown at 120. For the sake of conciseness, only elements that differ from the rotor body 12 of FIGS. 2-5 are described. In the embodiment shown, the recess 118c that receives the sealing member 21 is defined by the peripheral wall 118 instead of by the plate 116.

Figure 8:
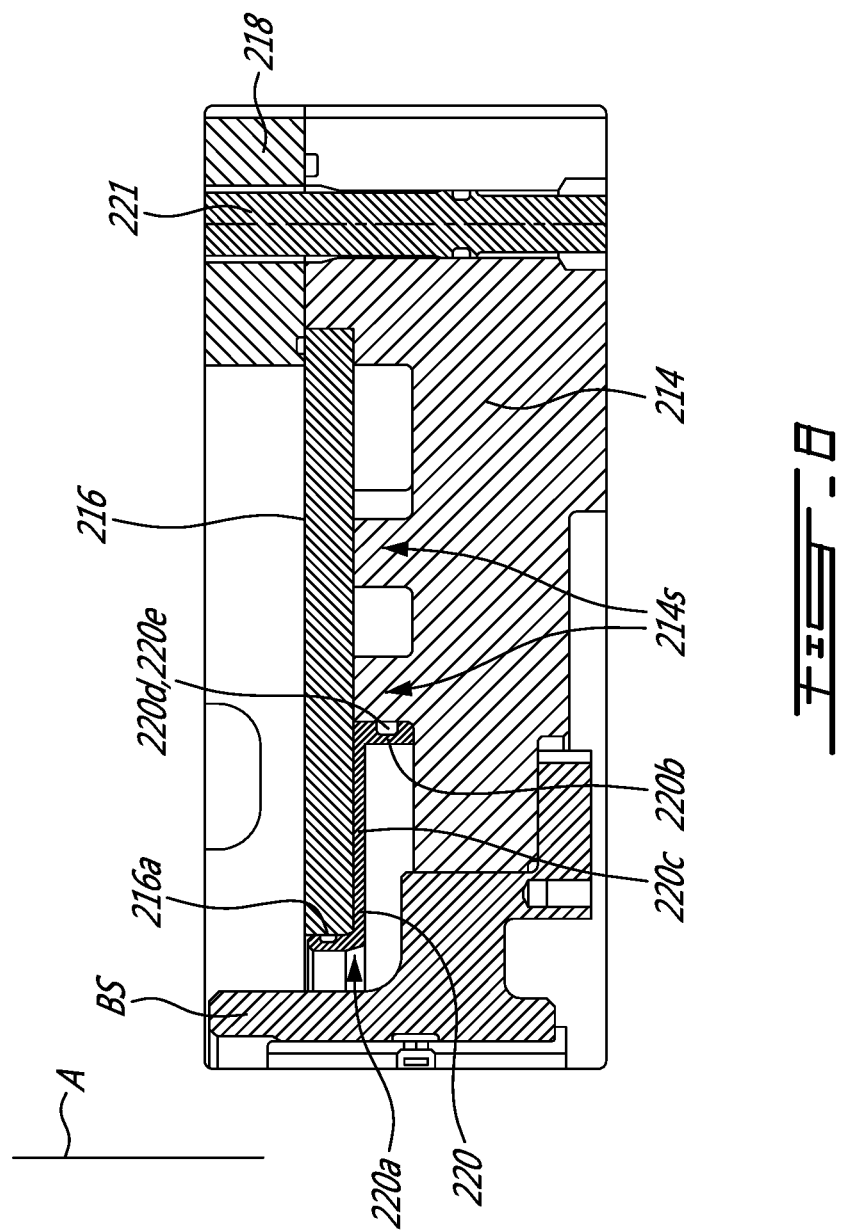
FIG. 8 is a schematic cross-sectional view taken along line B-B of FIG. 2 in accordance with another embodiment.

Referring now to FIG. 8, another embodiment of the outer body is generally shown at 220. As illustrated, bolts 221 are used to secure the peripheral wall 218 to the end walls 214. The end walls 214 defines a plurality of supports 214s for supporting the plates 216. The liquid coolant may circulate between the supports 214s. The plates 216 may have an epitrochoid shape and may define an aperture 216a for receiving a bearing support BS of the engine.

In the embodiment shown, a transfer housing 220 is used for sealing and centering an inner diameter of the plate 216 with respect to the peripheral wall 218. The transfer housing 220 may be made of an aluminum alloy. In the embodiment shown, the transfer housing 220 is annular and extends circumferentially all around the aperture 216a of the plate 216. The transfer housing 220 includes a plate-engaging section 220a and an end wall-engaging section 220b connected to the plate-engaging section 220a via a connecting section 220c. The transfer housing 220 may have a "Z" shape when seen in cross-section. In the embodiment shown, the plate-engaging section 220a is radially inward of the end wall-engaging section 220b relative to an axis A of the bearing support BS.

In the embodiment shown, each of the plate-engaging section 220a and the end wall-engaging section 220b defines a groove 220d for receiving a sealing member 220e, such as an O-ring. The sealing members 220e are used to seal an oil cavity and a cooling jacket. In other words, the sealing members 220e are used to prevent the lubricant from mixing with the liquid coolant. The oil cavity is located between the rotor 24 (FIG. 1) and the plate 16.

A material and dimensions of the transfer housing 220 are selected such that there are interference fits with both the end wall 214 and the plate 216. More specifically, the transfer housing 220 may be tightly fitted to the end wall 214 at the end wall-engaging section 220b and tightly fitted against a peripheral wall of the aperture 216a defined through the plate 216 at the plate-engaging section 220a. In some cases, the interference fit between the transfer housing 220 and the end wall 214 and the plate 216 is present at steady operating conditions of the engine. When the engine is starting, there may be no interference fit. The interference fit may gradually build as the engine is warming up.

For cooling the rotary engine, the liquid coolant may be circulated through the conduits 18b defined in the peripheral wall 18 and through the pockets 14g located between the plates 16 and the end walls 14. In the embodiment shown, the liquid coolant is circulated from the conduits 18b in the peripheral wall 18 to the pockets 14g via the spaces 14j defined between the ribs 14i of the end walls 14. The liquid coolant may therefore be in direct contact with the silicon carbide plates 16 to pick up heat generated by combustion of fuel in the combustion chambers 32 (FIG. 1) via conduction from the inner sides of the plates 16 that face the rotor cavity to outer sides of the plates 16 that face the pockets 14g and via convection from the outer sides of the plates 16 to the liquid coolant circulating in the pockets 14g. As the pockets 14g are radially aligned with and overlap the combustion chambers 32 relative to the axis of rotation of the rotor 24, a length of a thermal path from the combustion chambers 32 to the liquid coolant may be minimized. In other words, a thickness of material that needs to be travelled by the heat generated by the combustion is minimized and may correspond to the thickness t of the plates 16.

The present disclosure describes using a side housing assembly for which the side plate (seal running surface) is made of silicon carbide. Silicon carbide may offer the advantages of aluminum (e.g., high thermal conductivity combined with low density) but without its drawbacks (e.g., high thermal coefficient of expansion and low Young's modulus). In addition, silicon carbide's intrinsically high hardness may not require wear-resistant coating. The use of a silicon carbide side plate may thus provide a thermally and structurally stable running surface for the side that is also wear resistant. The present discloses the use of silicon carbide as side seal running surface in a Wankel engine, or any other rotary engine, as well as different mechanical arrangements that may allow the use a of a side plate made of ceramic. The silicon carbide plate may be mechanically unconstrained (floating) such that mechanical deformations imposed on it by surrounding structures may be minimized.

Embodiments disclosed herein include:

A. A rotary internal combustion engine comprising: a rotor; a housing circumscribing a rotor cavity, the rotor received within the rotor cavity, the housing having a peripheral wall and a side housing assembly secured to the peripheral wall, the side housing assembly having plates located at spaced apart ends of the peripheral wall, the plates defining seal running surfaces in sealing engagement with opposed end faces of the rotor, the plates made of silicon carbide.

B. A rotary internal combustion engine comprising: a rotor; a housing circumscribing a rotor cavity receiving the rotor, the housing having a peripheral wall, end walls secured to opposed ends of the peripheral walls, and silicon carbide plates located on inner sides of the end walls and facing the rotor cavity, the silicon carbide plates defining seal running surfaces in sealing engagement with end faces of the rotor.

C. A housing for a rotary internal combustion engine, the housing comprising: a peripheral wall; end walls secured to opposed ends of the peripheral wall, the peripheral wall and the end walls circumscribing a rotor cavity for receiving a rotor therein; and silicon carbide plates located on inner sides of the end walls and facing the rotor cavity, the silicon carbide plates defining seal running surfaces in sealing engagement with end faces of the rotor.

Embodiments A, B, C may include any of the following elements, in any combinations:

Element 1: the side housing assembly includes two end walls secured at opposed ends of the peripheral wall, the plates located on inner sides of the end walls, peripheries of the plates sandwiched between the end walls and the peripheral wall. Element 2: the end walls define recesses at the inner sides thereof, the plates received within the recesses. Element 3: the end walls define abutment surfaces at the recesses and oriented toward the plates, the plates spaced apart from the abutment surfaces. Element 4: the end walls are made of a material different than that of the plates. Element 5: the side housing assembly defines pockets between the end walls and the plates, the pockets configured for circulating a liquid coolant. Element 6: the end walls have a plurality of ribs circumferentially distributed around the rotor cavity, and the pockets in communication with spaces defined between the ribs. Element 7: the peripheral wall defines coolant conduits, the coolant conduits in fluid communication with the pockets. Element 8: the sealing members are located between the peripheries of the plates and the peripheral wall. Element 9: the sealing members are located within recesses defined by the plates. Element 10: the sealing members are located within recesses defined by the peripheral wall. Element 11: the end walls define recesses at the inner sides thereof, the plates received within the recesses. Element 12: the end walls define abutment surfaces at the recesses and oriented toward the silicon carbide plates, the silicon carbide plates spaced apart from the abutment surfaces. Element 13: peripheries the silicon carbide plates are sandwiched between the peripheral wall and the end walls. Element 14: the end walls are made of a material different than silicon carbide. Element 15: pockets are located between the end walls and the silicon carbide plates, the pockets configured for circulating a liquid coolant. Element 16: the end walls have a plurality of ribs circumferentially distributed around the rotor cavity, and the pockets in communication with spaces defined between the ribs. Element 17: the peripheral wall defines coolant conduits, the coolant conduits in fluid communication with the pockets.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A rotary internal combustion engine comprising:
   a rotor; and
   a housing circumscribing a rotor cavity receiving the rotor, the housing having a peripheral wall, end walls secured to opposed ends of the peripheral wall, and silicon carbide plates located on inner sides of the end walls and facing the rotor cavity, the silicon carbide plates defining seal running surfaces in sealing engagement with end faces of the rotor, the silicon carbide plates being movable relative to the end walls,
   wherein peripheries of the silicon carbide plates are sandwiched between the peripheral wall and the end walls.

2. The rotary internal combustion engine of claim 1, wherein the end walls define recesses at the inner sides thereof, the plates received within the recesses.

3. The rotary internal combustion engine of claim 2, wherein the end walls define abutment surfaces at the recesses and oriented toward the silicon carbide plates, the silicon carbide plates spaced apart from the abutment surfaces.

4. The rotary internal combustion engine of claim 1, wherein the end walls are made of a material different than silicon carbide.

5. The rotary internal combustion engine of claim 1, wherein pockets are located between the end walls and the silicon carbide plates, the pockets configured for circulating a liquid coolant.

6. The rotary internal combustion engine of claim 5, wherein the end walls have a plurality of ribs circumferentially distributed around the rotor cavity, and the pockets in communication with spaces defined between the ribs.

7. The rotary internal combustion engine of claim 6, wherein the peripheral wall defines coolant conduits, the coolant conduits in fluid communication with the pockets.

8. A housing for a rotary internal combustion engine, the housing comprising:
   a peripheral wall;
   end walls secured to opposed ends of the peripheral wall, the peripheral wall and the end walls circumscribing a rotor cavity for receiving a rotor therein; and
   silicon carbide plates located on inner sides of the end walls and facing the rotor cavity, the silicon carbide plates defining seal running surfaces in sealing engagement with end faces of the rotor, pockets located between the end walls and the silicon carbide plates, the pockets configured for circulating a liquid coolant.

9. The rotary internal combustion engine of claim 8, wherein the end walls define recesses at the inner sides thereof, the plates received within the recesses.

10. The rotary internal combustion engine of claim 9, wherein the end walls define abutment surfaces at the recesses and oriented toward the plates, the plates spaced apart from the abutment surfaces.

11. The rotary internal combustion engine of claim 8, wherein the end walls are made of a material different than that of the plates.

12. The rotary internal combustion engine of claim 8, wherein the end walls have a plurality of ribs circumferentially distributed around the rotor cavity, and the pockets in communication with spaces defined between the ribs.

13. The rotary internal combustion engine of claim 8, wherein the peripheral wall defines coolant conduits, the coolant conduits in fluid communication with the pockets.

14. The rotary internal combustion engine of claim 8, wherein sealing members are located between peripheries of the plates and the peripheral wall.

15. The rotary internal combustion engine of claim 14, wherein the sealing members are located within recesses defined by the plates.

16. The rotary internal combustion engine of claim 14, wherein the sealing members are located within recesses defined by the peripheral wall.

* * * * *